US008608056B2

(12) United States Patent
Wilson

(10) Patent No.: US 8,608,056 B2
(45) Date of Patent: Dec. 17, 2013

(54) GUIDING PATHWAY

(75) Inventor: Owen H. Wilson, Kitchener (CA)

(73) Assignee: NCR Corporation, Duluth, GA (US)

( * ) Notice: Subject to any disclaimer, the term of this patent is extended or adjusted under 35 U.S.C. 154(b) by 21 days.

(21) Appl. No.: 13/331,428

(22) Filed: Dec. 20, 2011

(65) Prior Publication Data

US 2013/0153653 A1 Jun. 20, 2013

(51) Int. Cl.
*G06Q 40/00* (2012.01)

(52) U.S. Cl.
USPC .......................................... 235/379; 235/381

(58) Field of Classification Search
USPC ............... 235/379, 381; 705/43; 270/3.2, 275
See application file for complete search history.

(56) References Cited

U.S. PATENT DOCUMENTS

| | | | | |
|---|---|---|---|---|
| 5,719,383 A * | 2/1998 | Forrest | .......................... | 235/379 |
| 5,850,075 A * | 12/1998 | Brannan et al. | ............... | 235/379 |
| 8,033,455 B2 * | 10/2011 | Graef et al. | .................. | 235/379 |
| 2004/0173672 A1 * | 9/2004 | Washington et al. | ......... | 235/379 |

* cited by examiner

*Primary Examiner* — Ahshik Kim
(74) *Attorney, Agent, or Firm* — Paul W. Martin

(57) ABSTRACT

A method and apparatus are disclosed for guiding an item of media travelling along a pre-determined transport pathway. The apparatus includes a guide body comprising an arcuate guide surface, at least one drive roller comprising an outer drive surface, and at least one pulley member having an outer item engaging surface that extends through an opening in the guide surface and is urged against the outer drive surface. The drive roller and pulley member co-operate to lift an item away from the guide surface at an arcuate region of the transport pathway.

17 Claims, 7 Drawing Sheets

GUIDING PATHWAY

FIELD OF THE INVENTION

The present invention relates to a method and apparatus for guiding an item of media travelling along a pre-determined transport pathway. In particular, but not exclusively, the present invention relates to how an item of media such as a currency note or the like may be conveyed along a transport pathway that is bent in at least one region. For example, when the pathway bends around a corner. The item is guided as it travels around the corner region minimising the chance of transport failure.

BACKGROUND TO THE INVENTION

Media depositories are used to receive media items from a customer. One common type of media depository is a sheet media depository for receiving items of media in sheet form. For example, such items of media can be currency notes, cheques, tickets, giros, receipts or the like.

Sheet media depositories are used in automated teller machines (ATMs) and other self-service terminals. Other such self-service terminals are vending machines, change machines, teller units, cash recyclers or the like. The sheet media depositories are used to identify, validate and store or return deposited sheets.

Some sheet depositories are capable of receiving a bunch of sheets in a loading area and then picking individual sheets from the bunch so that each sheet can then be identified and validated individually prior to storage of the validated sheet within a depository or returned to a customer. These depositories are sometimes referred to as bunch sheet depositories. Bunch sheet depositories may transport the bunch from a loading area to a picking area or the picking area may be adjacent to the loading area.

Bunches of items of media such as currency notes and/or cheques are thus deposited by a user and, subsequent to a user agreement step and item verification step, these items are stored semi-permanently within a self-service terminal until security staff or bank staff come to empty the storage unit. The storage unit is sometimes referred to as a stacking bin. Alternatively, when an input item is identified as being an illicit or damaged item, the item is stored in a storage unit referred to as a reject bin.

In prior known ATMs, teller assist units, and other self-service terminals or the like which may or may not include a depository, items such as cheques or currency notes are thus driven through a sheet transport system using pairs of rollers and/or belts that pinch the items and rotate to drive items along a pre-determined pathway. Often, at a final pair of rollers, the items are pushed into a stack of items being stored or dispensed. Because of the flexible nature of the items, it is difficult to ensure that transported items of media reach a desired destination.

Another problem which is well observed in prior art systems relates to the transportation of items of media such as cheques or currency notes as they travel around a corner. In this sense, it will be understood that a corner refers to any region where a direction of transport along a transport pathway changes quickly between 75° and 135°. Under such circumstances, a leading edge of an item of media tends to "scrape" along an outer radius of a curved guide or deflector. This can cause jamming of the document flow. Also, the item tends to bend under such movement and this resists movement which can ultimately cause "crumpling" or increased drive reel wear.

SUMMARY OF THE INVENTION

It is an aim of the present invention to at least partly mitigate the above-mentioned problems.

It is an aim of certain embodiments of the present invention to provide a method and apparatus for guiding an item of media as it travels along a pre-determined transport pathway which includes an arcuate region such as a corner region.

It is an aim of certain embodiments of the present invention to provide a drive roller at a centre of a radius of curvature at a curved region of a transport pathway together with spring loaded pinch idlers so that an item of media is driven around the corner region rather than merely being pushed through it.

It is an aim of certain embodiments of the present invention to provide a method and apparatus for guiding a transport path of an item of media in which the method includes urging an item of media along an arcuate guide surface and locating the item away from that guide surface on a rotating outer surface of one or more pulleys which extend through an opening in the guide surface.

It is an aim of certain embodiments of the present invention to provide a low cost pinch idler system which can assist in guiding items of media around a corner.

It is an aim of certain embodiments of the present invention to provide a method and apparatus for guiding items of media as they travel around a corner which is able to automatically and constantly adjust to document thickness and/or which can be assembled without the use of complex tools.

It is an aim of certain embodiments of the present invention to provide a method and apparatus that helps support and/or locate and/or drive an item of media along a straight or almost straight transport pathway.

According to a first aspect of the present invention, there is provided apparatus for guiding an item of media travelling along a pre-determined transport pathway, comprising:

a guide body comprising an arcuate guide surface;

at least one drive roller comprising an outer drive surface; and at least one pulley member having an outer item engaging surface that extends through an opening in the guide surface and is urged against the outer drive surface; wherein the drive roller and pulley member co-operate to lift an item away from the guide surface at an arcuate region of the transport pathway.

Aptly, the guide body comprises at least one pulley shaft support comprising a substantially C-shaped slot having an inner generally curved surface region and a substantially linear abutment surface region.

Aptly, the at least one pulley member comprises at least a pair of pulley members each having a groove extending circumferentially around a respective circular engaging surface and arranged to rotate about a respective pulley shaft supported in a respective pulley shaft support of the guide body wherein a resilient "O" ring member is looped around the grooves in the pair of pulley members.

Aptly, the groove in each pulley member has a depth greater than a cross-sectional thickness of the "O" ring member.

Aptly, as an item of media is located between the outer drive surface of the roller and the engaging surface of at least one pulley member, the drive shaft of the at least one pulley member is located against the linear abutment surface region of a respective pulley shaft support to increase tension in the "O" ring member.

Aptly, the at least one drive roller comprises a plurality of drive rollers arranged axially along a common drive shaft; and the at least a pair of pulley members comprises a plurality of pairs of resiliently connected pulley members juxtaposed against a respective one of the plurality of drive rollers.

Aptly, the arcuate guide surface has a first radius of curvature and the drive surface is substantially cylindrical having a radius of curvature substantially equal to the first radius of curvature.

Aptly, the drive roller and pulley member co-operate to simultaneously rotate and pinch said an item therebetween at a moving pinch point.

Aptly, said item of media is guided from a portion of the transport pathway in which the item travels in a first direction of travel to a further portion of the transport pathway in which the item travels in a further direction of travel, said further direction being about around 75° to 135° from the first direction.

According to a second aspect of the present invention, there is provided an automated teller machine (ATM) comprising apparatus for guiding an item of media travelling along a pre-determined transport pathway, comprising:

a guide body comprising an arcuate guide surface;

at least one drive roller comprising an outer drive surface; and at least one pulley member having an outer item engaging surface that extends through an opening in the guide surface and is urged against the outer drive surface; wherein the drive roller and pulley member co-operate to lift an item away from the guide surface at an arcuate region of the transport pathway and each item of media comprises a currency note.

According to a third aspect of the present invention, there is provided a method for guiding an item of media travelling along a pre-determined transport pathway, comprising:

urging an item of media along an arcuate guide surface of a guide body;

driving at least one drive roller comprising an outer drive surface to thereby rotate at least one co-operating pulley member that comprises an outer item engaging surface that extends through an opening in the guide surface; and lifting the item away from the guide surface at an arcuate region of the transport pathway via the rotating item engaging surface.

Aptly, the method includes the step of guiding said item of media from a portion of the transport pathway in which the item travels in a first direction of travel to a further portion of the transport pathway in which the item travels in a further direction of travel which is about around 75° to 135° from the first direction.

Aptly, the method includes supporting a pulley shaft of the pulley member in a substantially C-shaped slot comprising an inner generally curved surface region that includes a substantially linear abutment surface; and urging the pulley shaft against the linear abutment surface as the item of media is pinched between the drive roller and the pulley member.

Aptly, the method includes as the pulley shaft is urged against and rides along the linear abutment surface, simultaneously and automatically increasing an urging force by stretching a resilient "O" ring that is arranged to urge the pulley towards the roller.

According to a fourth aspect of the present invention, there is provided a method for guiding an item of media along a transport path, comprising the steps of:

urging an item of media along an arcuate guide surface; and locating the item away from the guide surface on a rotating outer surface of at least one pulley that extends through an opening in the guide surface.

According to a fifth aspect of the present invention, there is provided apparatus for guiding an item of media travelling along a pre-determined transport pathway, comprising:

a guide body comprising a guide surface;

at least one drive roller comprising an outer drive surface; and at least one pulley member having an outer item engaging surface that extends through an opening in the guide surface and is urged against the outer drive surface; wherein the drive roller and pulley member co-operate to lift an item away from the guide surface at a predetermined region of the transport pathway.

Certain embodiments of the present invention provide a moving surface for a leading edge of an item of media such as a currency note or the like to travel on whilst bending around a corner region. This helps reduce the risk of jamming.

Certain embodiments of the present invention reduce a drive force required to transport items of media. This helps lessen the load on a motor.

Certain embodiments of the present invention provide a low cost pinch idler system which includes no unnecessary spring or idler arms.

Certain embodiments of the present invention provide a small footprint which allows placement in tight quarters.

Certain embodiments of the present invention can be adapted to be used in straight line or near straight line transport.

Certain embodiments of the present invention require no or only a very limited number of tools for assembly.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
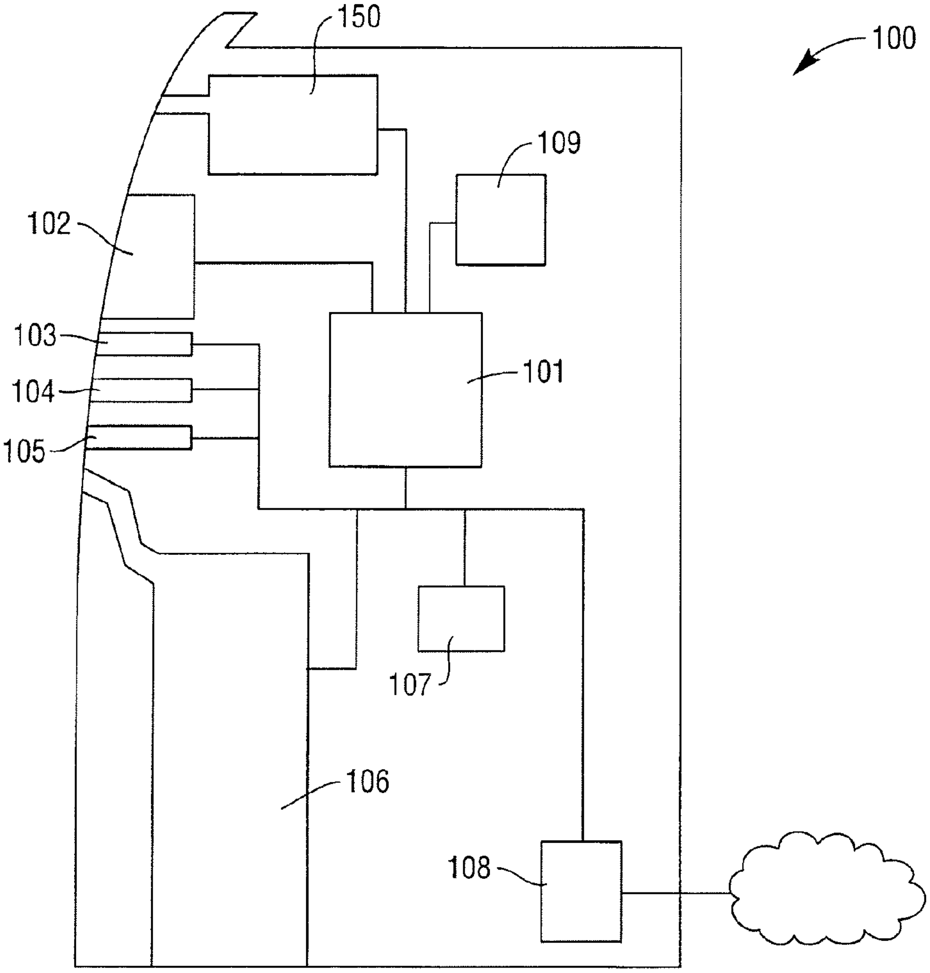
FIG. 1 is a schematic diagram of an ATM according to an embodiment of the present invention.

In the drawings like reference numerals refer to like parts.

FIG. 1 illustrates a block diagram of a self-service terminal 100 in the form of an automated teller machine (ATM) according to one embodiment of the present invention. It will be understood that certain embodiments of the present invention are applicable to other types of terminal such as ATMs, cash recyclers, teller assist units, vending machines, self-service terminals, change machines and the like.

The ATM 100 includes different modules for enabling transactions to be executed and recorded by the ATM 100. These ATM modules include customer transaction modules and service personnel modules. The ATM modules include an ATM controller 101, a customer display 102, a card reader/writer module 103, an encrypting keypad module 104, a receipt printer module 105, a cash dispenser module 106, a journal printer module 107 for creating a record of every transaction executed by the ATM, a connection module 108, an operator panel module 109 for use by a service operator (such as a field engineer, a replenisher (of currency, of printed paper or the like), or the like).

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers.

FIG. 1 also illustrates a schematic diagram of a deposit module 150 according to one embodiment of the present invention. The deposit module 150 is operable to receive bunches of items of media such as currency notes, bank notes and/or cheques from a customer. These can be stored securely or returned to a customer.

Figure 2:
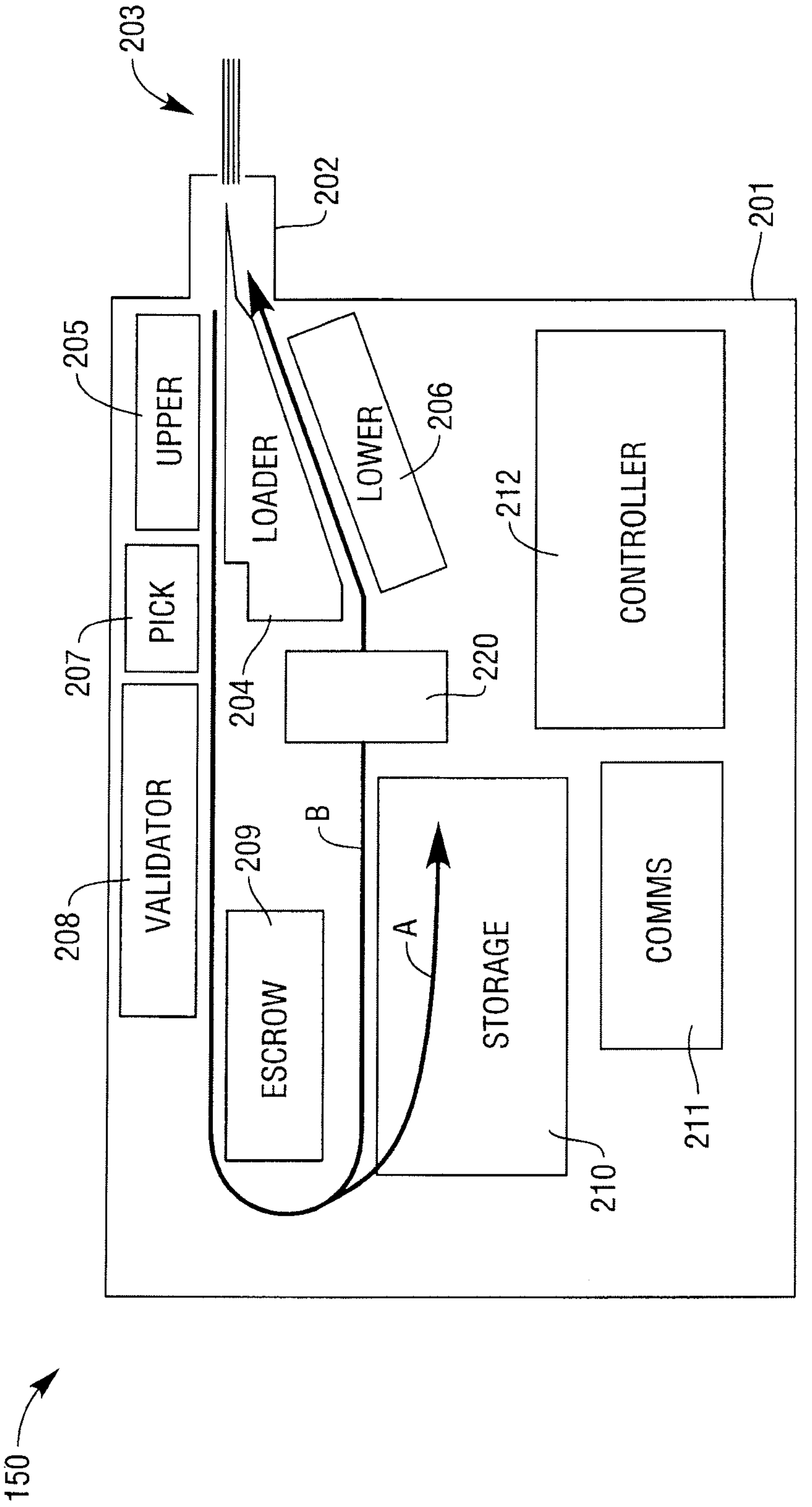
FIG. 2 is a schematic diagram of a depository according to an embodiment of the present invention.

The depository is shown in more detail in FIG. 2 and includes a chassis 201 onto which various parts are mounted. The depository 150 further includes a bunch deposit slot 202 at which a customer (not shown) can introduce a bunch 203 of currency notes or other such items of media. This enables the sheet items of media to be deposited by a customer. A bunch loader 204 co-operates with an upper loading unit 205 and a lower dispatch unit 206. These co-operate to receive the bunch of items of media and move them to a pick unit 207 or return them to a customer via slot 202 respectively. The pick unit 207 is aligned with the bunch loader 204 for removing individual sheets from the bunch of sheets 203. A sheet validator 208 determines whether the items of media are valid. An escrow 209 is provided for temporarily storing validated sheets until a customer confirms they wish to complete a transaction. A storage compartment 210 is provided as well as a communication circuit board 211 for communicating with the self-service terminal into which the depository 15 may be installed. An on-board controller 212 is provided for controlling the operation of the depository 150.

The depository 150 includes a plurality of transport units only some of which are described herein. An upper sheet transport section 205 is located above the bunch loader and adjacent to the picker 207. A lower sheet transport section 206 is located beneath the bunch loader 204 and near the bunch deposit slot 202.

The bunch loader 204 is used to transport deposited bank notes from the bunch deposit slot 202 to the pick unit 207.

There are two different routes that can be taken by an item of media that is inserted into the depository 150. A first route is shown by arrow A and involves the sheet item being picked from the bunch of sheets 203, transported to the picker unit 207, moved past the validator 208 to be identified and validated, placed in the escrow 209 and from the escrow 209 transported into the storage compartment 210.

The second optional route is shown by the arrow B and involves the sheet item being picked from the bunch of sheets 203, transported to the picker unit 207, moved past the validator 208 to be identified and validated, placed in the escrow 209 and from the escrow 209 returned to the customer via a rebunching unit 220 and via the loading unit 204 and lower transport section 206.

As will be understood by those skilled in the art, whether a sheet item is stored (that is to say, follows the route shown by arrow A) or returned to a customer (that is to say, follows a path shown by arrow B) depends on a number of factors, such as whether the sheet is recognised, whether a sheet is validated and/or whether a customer cancels or confirms a transaction or the like.

Figure 3:
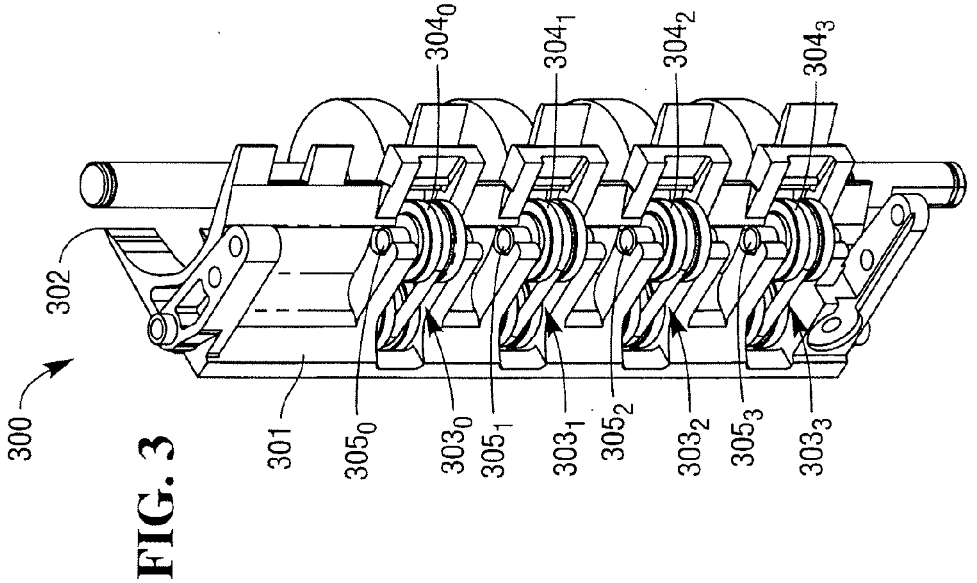
FIG. 3 illustrates a corner guide body with a co-operating drive roller array.

FIG. 3 illustrates a guide body and associated drive rollers according to a first embodiment of the present invention. The apparatus 300 for guiding an item of media such as a currency note or the like which travels along a pre-determined transport pathway includes a guide body 301 which includes a smooth arcuate guide surface 302. The guide body 301 is an elongate corner-shaped structure manufactured from a rigid material such as plastic or metal or the like. As illustrated in FIG. 3, the body supports four pairs $303_{0\text{-}3}$ of pulleys which themselves are substantially cylindrical bodies with a shaft extending therefrom at each end. A first pulley $304_{0\text{-}3}$ of each pair is predominantly shown in FIG. 3. A respective shaft $305_{0\text{-}3}$ at a first end of each of these pulleys is located in a respective slot $306_{0\text{-}3}$ in the guide body 301 whilst a respective shaft at a second end of each pulley is located in a respective slot.

Figure 4:
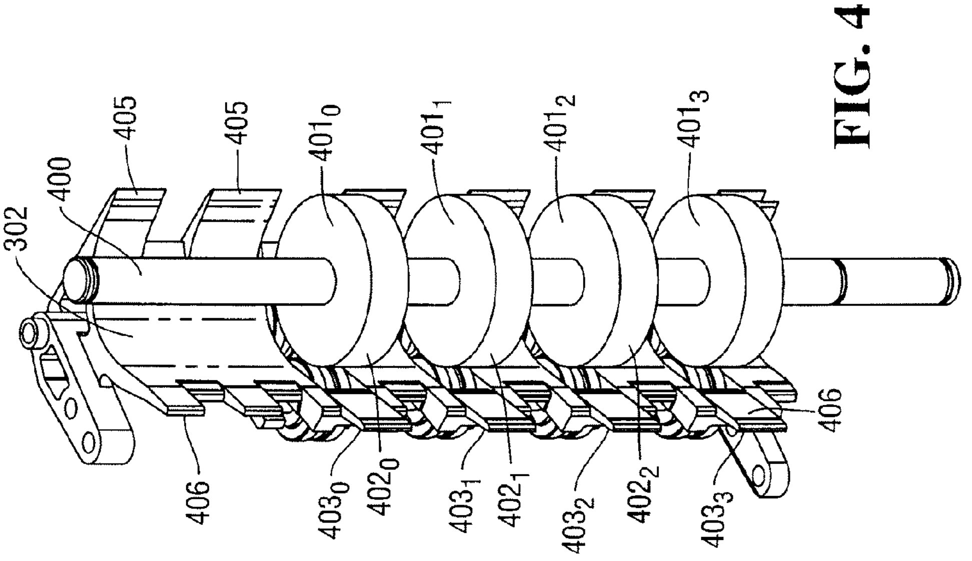
FIG. 4 illustrates another view of the guide body and drive roller array shown in FIG. 3.

FIG. 4 illustrates another view of the body shown in FIG. 3 and illustrates how a shaft 400 carries four drive rollers $401_{0\text{-}3}$, each of which has a respective outer drive surface $402_{0\text{-}3}$ which is substantially cylindrical. The outer drive surface could of course be curved or grooved or the like. Each roller 401 is spaced apart along the length of the shaft 400 and fixed in place at a respective location whereby the outer drive surface 402 of each roller is located opposite a respective opening $403_{0\text{-}3}$ through which the outer item engaging surfaces of the pulleys in the pairs of pulleys extend.

FIG. 4 also helps illustrate how the guide body provides a guide surface 302 which is curved in some parts. It will be understood that embodiments of the present invention are not restricted to use with a curved guide surface. Rather a straight or nearly straight guide surface may be used in which case the pulleys extending through apertures in the surface will merely help guide the item from one location to another location.

The guide body also includes entry fingers 405 and exit fingers 406 which assist in guiding an item of media towards and away from the guide surface.

Figure 5:
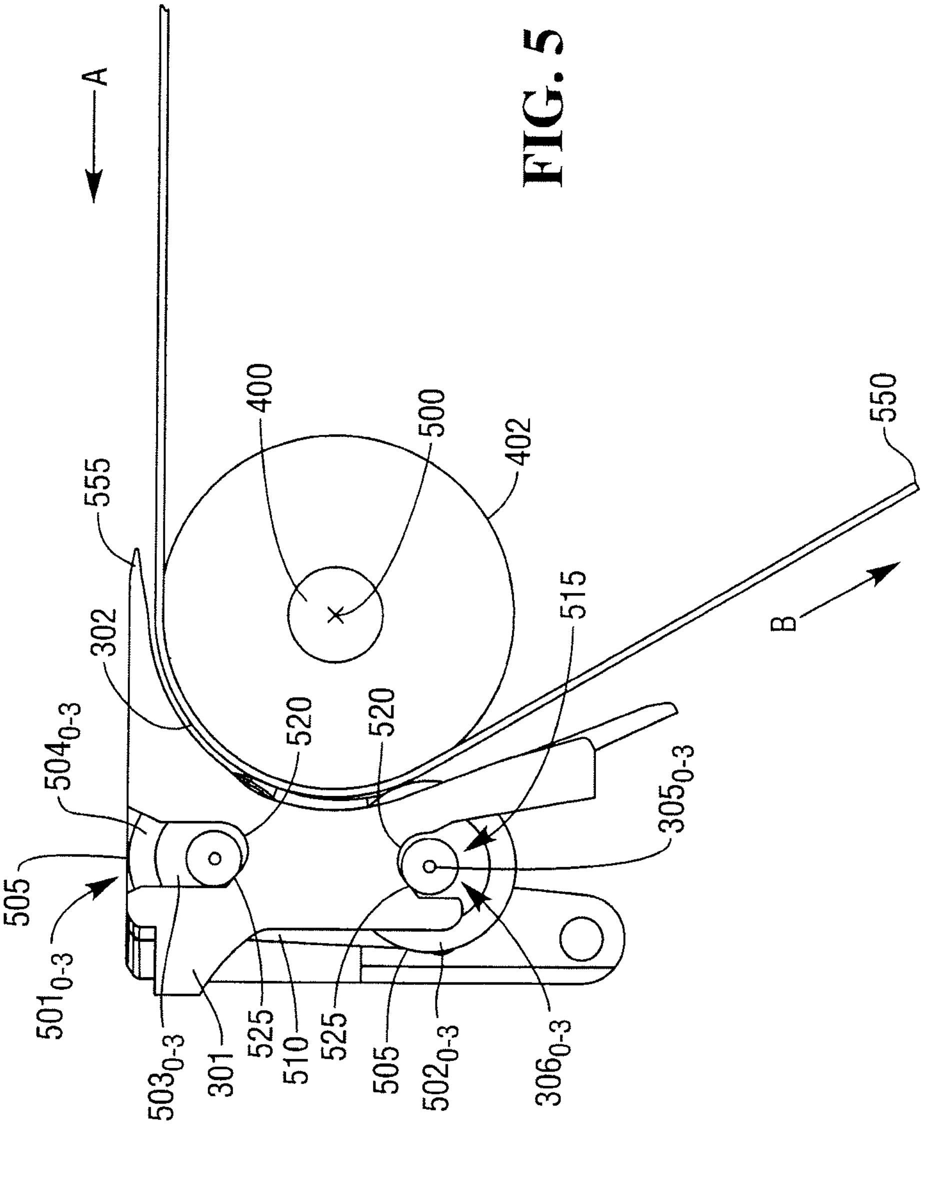
FIG. 5 illustrates a cross-sectional view of the guide body and drive roller shown in FIGS. 3 and 4 with an item of media being guided around an arcuate region.

FIG. 5 illustrates a cross-section through the guide body 301, the shaft 400 and rollers 401 shown in FIGS. 3 and 4. The shaft 400 rotates about an axis of rotation 500 and rotates in an anti-clockwise direction shown in FIG. 5 as an item of media is introduced along a pre-determined transport pathway having an initial direction shown by the arrow A in FIG. 5. The transport pathway is curved at an arcuate region defined by the curved inner surface 302 of the guide body 301. The item of media leaves the guide in an exit direction illustrated by the arrow B shown in FIG. 5. Thus, a direction of transport of an item is guided from a first direction to a further direction. An angle between the first direction and the further direction is aptly between 75° and 135°. Aptly, the first direction may be equal to the further direction. Aptly, the direction of transport is turned through more than 90° as it is guided. Aptly, the change in direction is about around 100° to 140°

As illustrated in FIG. 5, in cross-section the guide body 301 includes two opposed slots. One of these slots $306_{0\text{-}3}$ is illustrated in FIG. 3. A remaining slot $501_{0\text{-}3}$ is shown in FIG. 5. The slots $306_{0\text{-}3}$ which face generally in an exit direction locate shafts $305_{0\text{-}3}$ of a first pulley $502_{0\text{-}3}$ of the four pairs of pulleys. The opposed slots $501_{0\text{-}3}$ locate shafts $503_{0\text{-}3}$ of a further pulley $504_{0\text{-}3}$ in the pair of pulleys. An outer item engaging surface 505 of the pulleys is substantially circular in cross-section and includes a groove in the outer surface of each pulley which locates an elastomeric endless belt 510. Aptly, the elastomeric belt is a rubber "O" ring or the like.

As illustrated in FIG. 5, the slots have a generally C-shaped cross-section. That is to say, each slot has an open mouth region 515, then side walls 516 which extend from the open mouth downwards into a curved abutment surface region 520. The curved bottoms 520 of each slot extend into a side wall spaced furthest away from the roller 401 via a linear wall region 525. In use, the shafts of the pulleys will ride upwards on these linear wall regions as they are displaced from the bottom of the slots. This occurs when an item of media having a finite thickness is located between the roller and opposed pulley.

With no item of media located between the outer drive surface 402 of the roller and the outer item engaging surface 505 of the pulleys, the elastomeric nature of the belt 510 draws the pulley shafts to the bottom curved section of each slot. The outer item engaging surfaces of the two pulleys which extend through respective apertures in the guide surface 302 thus engage the outer drive surface 402 of a respective drive roller.

In use, an item of media is directed towards the curved guide surface along the direction shown by arrow A in FIG. 5. A leading edge 550 of the item follows a path between the outer drive surface 402 of the roller and an initial guide region 555 of the guide surface. Thereafter, the item of media begins to ride along between the roller and the guide surface which are spaced apart at this point. Because the roller engages with the outer item engaging surfaces of the two pulleys, driving the drive roller causes the pulleys to constantly rotate in their respective slots. Thus, eventually the leading edge 550 of an item of media will engage with a rotating surface 505 of the pulley $\mathbf{504}_{0\text{-}3}$ in a pair which is closer to an input region of the guide body than the pulley $\mathbf{502}_{0\text{-}3}$ nearer to the exit of the guide body. Because the outer item engaging surface of the pulley is rotating, the leading edge 550 of the item of media is lifted away from the abutment guide surface 302 of the guide body. As the item of media is subsequently pinched and moved with rotation of the drive roller, the leading edge 550 of the item eventually becomes located between the outer drive surface of the roller and the outer item engaging surface of the pulley $\mathbf{502}_{0\text{-}3}$ which is downstream of the pair of pulleys. At this stage, the shaft of the pulley 502 is located away from the bottom curved region 520 of its respective slot, just like the shaft 503 of the upstream pulley in the pair. The item of media continues to be driven around the curved abutment surface but is supported away from the abutment surface by the two rotating pulleys in the pulley pair. It will be appreciated that as the item of media is moved around the curved guide surface the item will experience a pinching force between pairs of pulleys and respective rollers supported by the guide body dependent upon the size of the item of media.

The guide body thus has two open ended slots with angled faces located on the sides of the slots away from an item of media. The grooved pulley assemblies are installed into the guide slots with an "O" ring stretched over both of the pulleys in a pair. The elasticity of the "O" ring retains the idler pulleys in the bottom of their respective slots. The groove in each pulley is slightly larger/deeper than the diameter of the "O" ring. This allows the idler pulley to ride against the inner drive roller and rotate without the "O" ring making contact with the drive roller. The rotation of the pulley drives the "O" ring. This helps reduce wear on the "O" ring.

As the document enters a corner region or other curved region defined by the curved guide surface it comes into contact with an already moving surface provided by the "O" ring and the idler pulleys. This lifts the lead edge of the document off the static surface of the guide body and begins to move the item around the curved corner region. When the document enters the pinch area between the drive roller and each pinch idler and "O" ring assembly the pinch idler and "O" ring assembly move away to accommodate the thickness of the item of media. This is accomplished by the idler shafts sliding up the angled surface of the linear walls 525 of the idler mounting slot with the pinch force being provided by the stretching of the "O" ring belt as it moves away and increases its length. Once the document has passed through, the idler pulleys return to their home position in the bottom of the slots and the "O" ring returns to its normal working length. The purpose of the flat section in each slot is thus to provide a surface for the shaft of the pulley to slide against. If the slot was simply larger than the shaft and did not include such a flat section the shaft of the pulley would just move away when an item of media entered the drive system, but the tension in the "O" ring would not increase. This would result in little or no pinch pressure in the drive system and the "O" ring would not necessarily return to its home position. By including the angled surfaces the tension in the "O" ring is maintained/increased, which in turn maintains a pinch force on an item of media. This consistent force or tension also helps return the pulleys to a home position after an item of media has exited.

Figure 6:
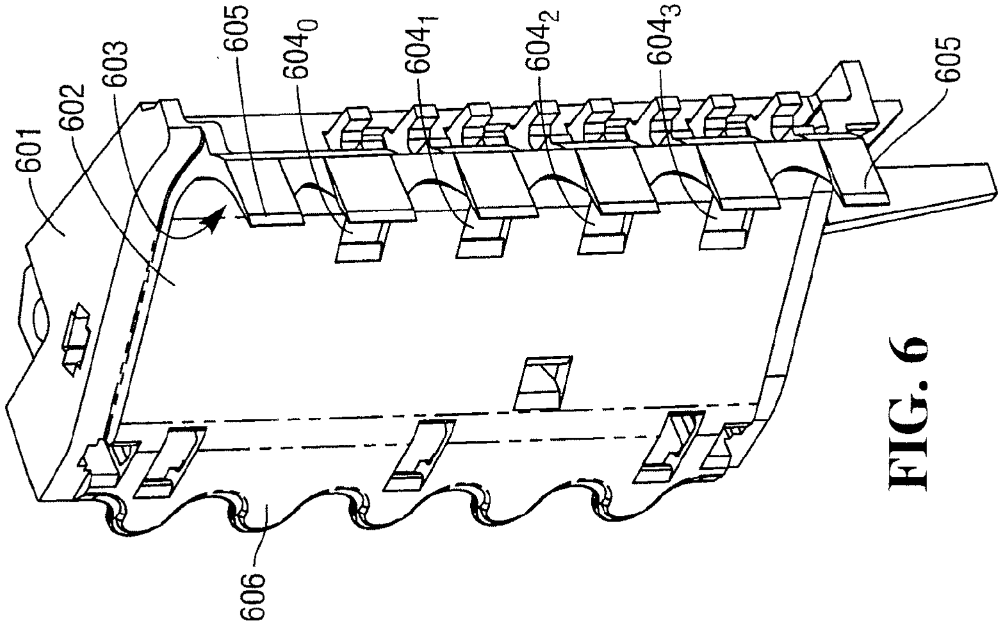
FIG. 6 illustrates a guide body according to a second embodiment of the present invention.

FIG. 6 illustrates an alternative guide body according to a further embodiment of the present invention. The drive roller and associated shaft is not shown in FIG. 6 (nor indeed FIG. 7) for clarity purposes. As illustrated in FIG. 6, the guide body 601 is an elongate rigid structure which includes a smooth guide surface region 602 and a smooth curved guide surface region 603. Apertures $\mathbf{604}_{0\text{-}3}$ extend as through holes through the guide body. In use, these enable the pulleys to break through across the profile of the curved guide surface. Fingers 605 extend towards an approaching item of media and help guide a leading edge of the item of media onto the curved abutment surface 603 between the surface 603 and the curved surface of rollers. The planar region of the surface 602 guides items of media as they leave the curved guide surface region towards an exit support surface region 606 and eventually the item moves towards an exit orifice.

Figure 7:
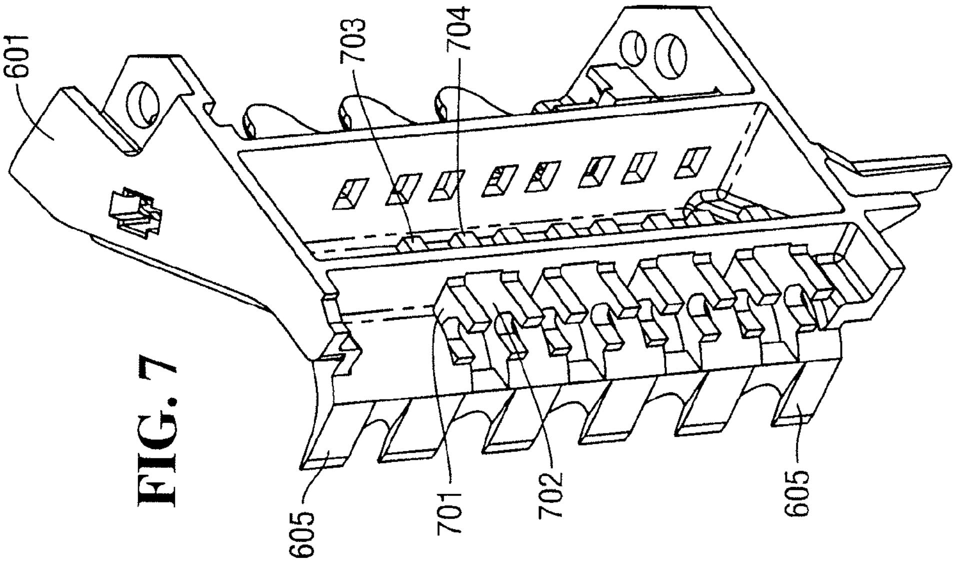
FIG. 7 illustrates an alternative view of the guide body shown in FIG. 6.

FIG. 7 illustrates another view of the guide body 601 shown in FIG. 6 in more detail and illustrates how the body includes supports for opposed pulleys as per those described with respect to the first embodiment. As illustrated in FIG. 7 a first pair of supports 701, 702 are spaced apart to engage an upper and lower shaft of a respective pulley. Facing away from these first and further upper and lower supports is a third support 703 and further support 704. These supports locate the shafts of a further pulley in the pair. Further pulley supports are provided along the length of the guide body to support the four pairs of pulleys. It will be appreciated that certain embodiments of the present invention may be used with only one pair of opposed pulleys and one opposed roller or two pairs of pulleys with two opposed rollers or any number of pairs of pulleys with respective rollers.

Figure 8:
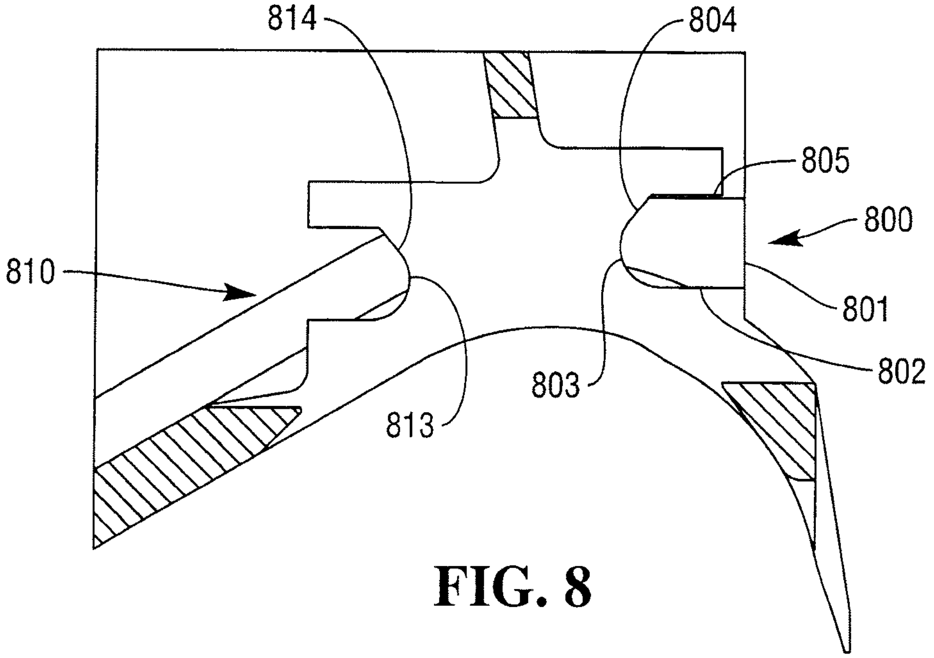
FIG. 8 illustrates a cross-sectional view through the guide body shown in FIG. 6.

FIG. 8 helps illustrate the configuration of the slots which locate the shafts of the pulleys in the guide body shown in FIGS. 6 and 7. As illustrated in FIG. 8, the guide body provides an opposed pair of slots with a first slot 800 having an open mouth 801 facing to the right hand side shown in FIG. 8. This slot has a linear region 802 which extends into a curved region 803 which forms a curved bottom to the slot 800. The curved bottom then extends through a straight region 804 into another linear wall portion 805 which leads back towards the open mouth 801 of the slot.

The opposed slot 810 likewise has a curved bottom region 813 and a linear region 814. The slots in each pair of slots which house shafts for respective pulleys of a pulley pair may have an offset longitudinal axis as shown in FIG. 8 or may be substantially aligned.

Figure 9:
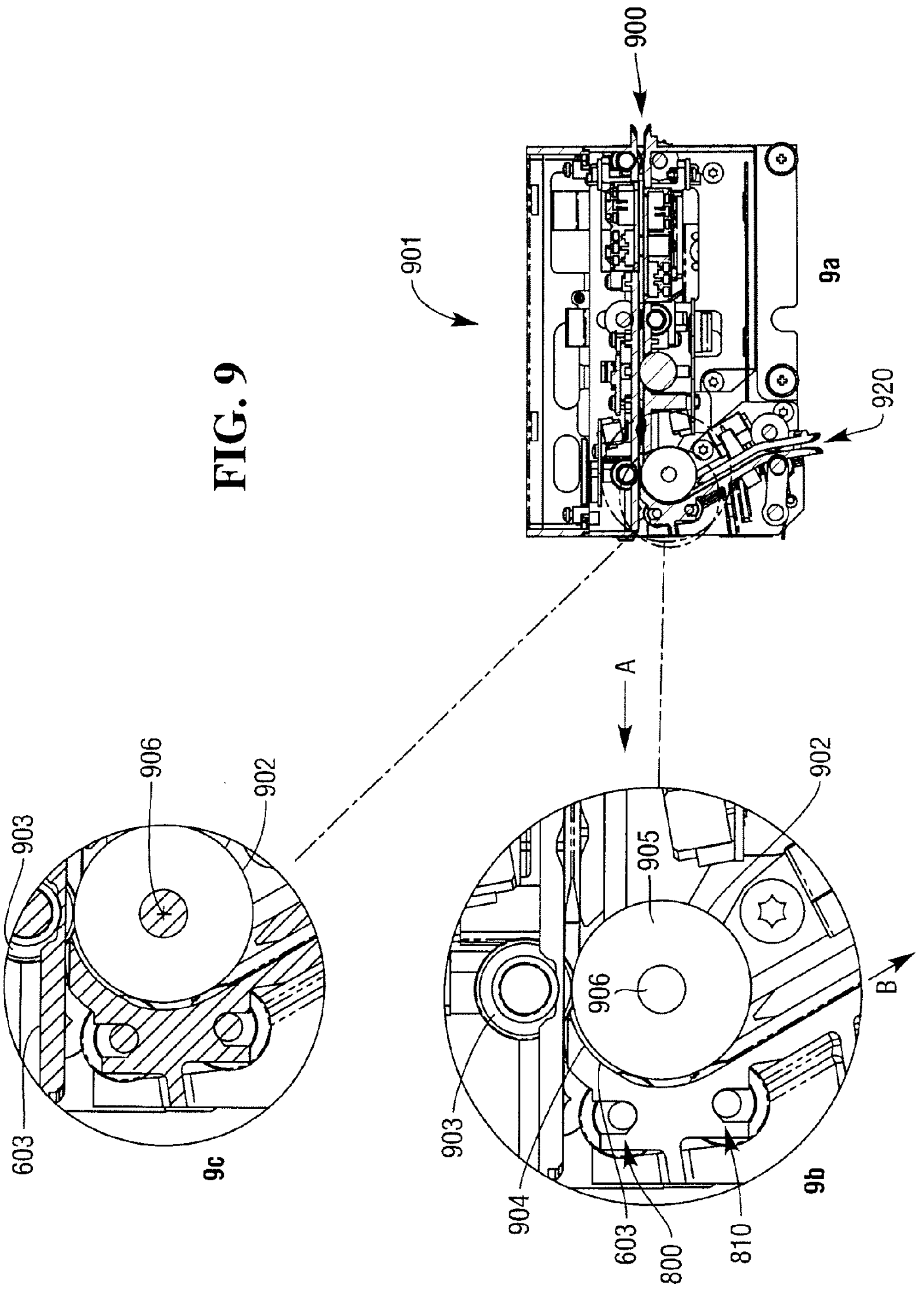
FIG. 9 illustrates an in situ guide body and drive roller in location within a module of an ATM.

FIG. 9 helps illustrate the location of the guide body pulleys and "O" ring in a module of an ATM in more detail. As illustrated in FIG. 9*a* an entrance orifice 900 is provided to receive items of media one-by-one. The items of media are introduced consecutively and are transported along a transport pathway from right to left in FIG. 9*a* during an initial part of the transport pathway. FIG. 9*b* and FIG. 9*c* are magnified views of parts of the module 901 shown in FIG. 9*a*. As shown in FIG. 9*b* an entrance pathway into the curved region of the transport pathway is defined by the direction shown by arrow A. An item of media thus travels between two opposed pathway surfaces where it is engaged between an outer surface 902 of a driven roller and a pinch roller 903. This helps pinch an item of media and drive a leading edge of an item of media onto a leading directing surface 904 which leads the item onto the curved guide surface 603. As the guide roller 905 rotates about a respective axis 906, the pulleys in each pair of pulleys sat in the respective slots 800, 810, rotate with rotation of the driven roller. As previously described, an item of media is thus guided around the curved guide surface 603 by being lifted off the surface by a rotating pulley surface. This helps avoid wear and also risk of crumpling to an item of media. The item of media is thereafter guided into an exit direction of travel shown by arrow B and thereafter to an exit orifice 920.

Certain embodiments of the present invention thus provide a moving surface for a leading edge of an item of media to travel on whilst bending around a corner. This helps reduce jams and drive force required to transport the item. Certain embodiments of the present invention also provide a mechanically non-complex and low cost pinch idler system. Using an expanding "O" ring the pinch idler system is allowed to adjust to document thickness without the need for complex or costly mechanisms.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. Apparatus for guiding an item of media travelling along a pre-determined transport pathway, comprising:
- a guide body comprising an arcuate guide surface;
- at least one drive roller comprising an outer drive surface; and
- at least one pulley member having an outer item engaging surface that extends through an opening in the guide surface and is urged against the outer drive surface;
- wherein the drive roller and pulley member engage opposite sides of an item to lift the item away from the guide surface at an arcuate region of the transport pathway.

2. The apparatus as claimed in claim 1, further comprising:
- the guide body comprises at least one pulley shaft support comprising a substantially C-shaped slot having an inner generally curved surface region and a substantially linear abutment surface region.

3. The apparatus as claimed in claim 2, further comprising:
- the at least one pulley member comprises at least a pair of pulley members each having a groove extending circumferentially around a respective circular engaging surface and arranged to rotate about a respective pulley shaft supported in a respective pulley shaft support of the guide body wherein a resilient "O" ring member is looped around the grooves in the pair of pulley members.

4. The apparatus as claimed in claim 3, further comprising:
- the groove in each pulley member has a depth greater than a cross-sectional thickness of the "O" ring member.

5. The apparatus as claimed in claim 3, further comprising:
- as an item of media is located between the outer drive surface of the roller and the engaging surface of at least one pulley member, the drive shaft of the at least one pulley member is located against the linear abutment surface region of a respective pulley shaft support to increase tension in the "O" ring member.

6. The apparatus as claimed in claim 3, further comprising:
- the at least one drive roller comprises a plurality of drive rollers arranged axially along a common drive shaft; and
- the at least a pair of pulley members comprises a plurality of pairs of resiliently connected pulley members juxtaposed against a respective one of the plurality of drive rollers.

7. The apparatus as claimed in claim 1, further comprising:
- the arcuate guide surface has a first radius of curvature and the drive surface is substantially cylindrical having a radius of curvature substantially equal to the first radius of curvature.

8. The apparatus as claimed in claim 1, further comprising:
- the drive roller and pulley member co-operate to simultaneously rotate and pinch said an item therebetween at a moving pinch point.

9. The apparatus as claimed in claim 1, further comprising:
- said item of media is guided from a portion of the transport pathway in which the item travels in a first direction of travel to a further portion of the transport pathway in which the item travels in a further direction of travel, said further direction being about around 75° to 135° from the first direction.

10. An automated teller machine (ATM) comprising:
- an apparatus for guiding an item of media travelling along a pre-determined transport pathway, including
  - a guide body comprising an arcuate guide surface;
  - at least one drive roller comprising an outer drive surface; and at least one pulley member having an outer item engaging surface that extends through an opening in the guide surface and is urged against the outer drive surface;

wherein the drive roller and pulley member engage opposite sides of an item to lift the item away from the guide surface at an arcuate region of the transport pathway;

wherein the item of media comprises a currency note.

11. A method for guiding an item of media travelling along a pre-determined transport pathway, comprising:

urging an item of media along an arcuate guide surface of a guide body;

driving at least one drive roller comprising an outer drive surface to thereby engage an outer item engaging surface of at least one co-operating pulley member that extends through an opening in the guide surface and rotate the at least one co-operating pulley member; and lifting the item away from the guide surface at an arcuate region of the transport pathway via the rotating item engaging surface when the item is between the outer item engaging surface of the at least one co-operating pulley member and the outer drive surface of the at least one drive roller.

12. The method as claimed in claim 11, further comprising:

guiding said item from a portion of the transport pathway in which the item travels in a first direction of travel to a further portion of the transport pathway in which the item travels in a further direction of travel which is about around 75° to 135° from the first direction.

13. The method as claimed in claim 11, further comprising:

supporting a pulley shaft of the pulley member in a substantially C-shaped slot comprising an inner generally curved surface region that includes a substantially linear abutment surface; and urging the pulley shaft against the linear abutment surface as the item of media is pinched between the drive roller and the pulley member.

14. The method as claimed in claim 13, further comprising:

as the pulley shaft is urged against and rides along the linear abutment surface, simultaneously and automatically increasing an urging force by stretching a resilient "O" ring that is arranged to urge the pulley towards the roller.

15. Apparatus for guiding an item of media travelling along a pre-determined transport pathway, comprising:

a guide body comprising an arcuate guide surface and at least one pulley shaft support including a substantially C-shaped slot having an inner generally curved surface region and a substantially linear abutment surface region;

at least one drive roller comprising an outer drive surface; and at least one pulley member having an outer item engaging surface that extends through an opening in the guide surface and is urged against the outer drive surface, wherein the at least one pulley member includes at least a pair of pulley members each having a groove extending circumferentially around a respective circular engaging surface and arranged to rotate about a respective pulley shaft supported in a respective pulley shaft support of the guide body wherein a resilient "O" ring member is looped around the grooves in the pair of pulley members;

wherein the drive roller and pulley member co-operate to lift an item away from the guide surface at an arcuate region of the transport pathway.

16. Apparatus for guiding an item of media travelling along a pre-determined transport pathway, comprising:

a guide body comprising an arcuate guide surface having a first radius of curvature;

at least one drive roller comprising a substantially cylindrical outer drive surface having a radius of curvature substantially equal to the first radius of curvature; and at least one pulley member having an outer item engaging surface that extends through an opening in the guide surface and is urged against the outer drive surface;

wherein the drive roller and pulley member co-operate to lift an item away from the guide surface at an arcuate region of the transport pathway.

17. A method for guiding an item of media travelling along a pre-determined transport pathway, comprising:

urging an item of media along an arcuate guide surface of a guide body;

driving at least one drive roller comprising an outer drive surface to thereby rotate at least one co-operating pulley member that comprises an outer item engaging surface that extends through an opening in the guide surface;

lifting the item away from the guide surface at an arcuate region of the transport pathway via the rotating item engaging surface;

supporting a pulley shaft of the pulley member in a substantially C-shaped slot comprising an inner generally curved surface region that includes a substantially linear abutment surface;

urging the pulley shaft against the linear abutment surface as the item of media is pinched between the drive roller and the pulley member; and as the pulley shaft is urged against and rides along the linear abutment surface, simultaneously and automatically increasing an urging force by stretching a resilient "O" ring that is arranged to urge the pulley towards the roller.

* * * * *